H. N. LINES.
ACETYLENE GAS GENERATOR.
APPLICATION FILED JULY 14, 1910.
992,723.
Patented May 16, 1911.
2 SHEETS—SHEET 1.
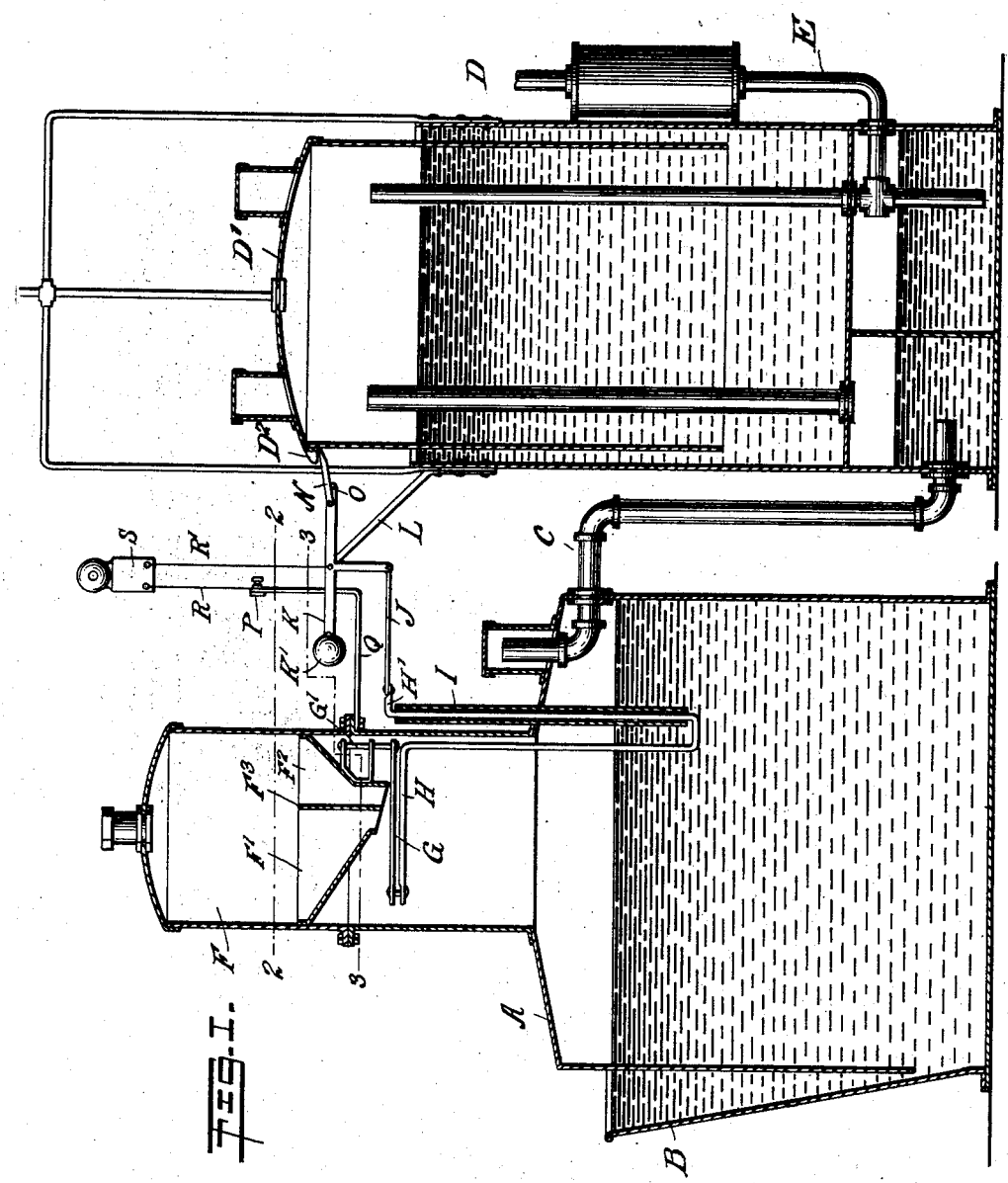
WITNESSES:
G. Robert Thomas
INVENTOR
Howard N. Lines
BY Munn & Co.
ATTORNEYS H. N. LINES.
ACETYLENE GAS GENERATOR.
APPLICATION FILED JULY 14, 1910.
992,723.
Patented May 16, 1911.
2 SHEETS—SHEET 2.
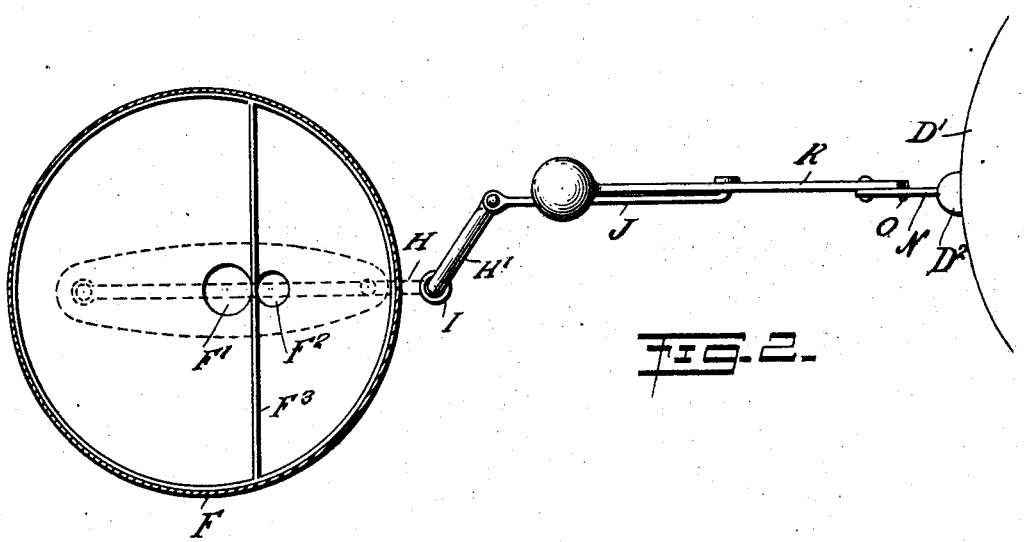
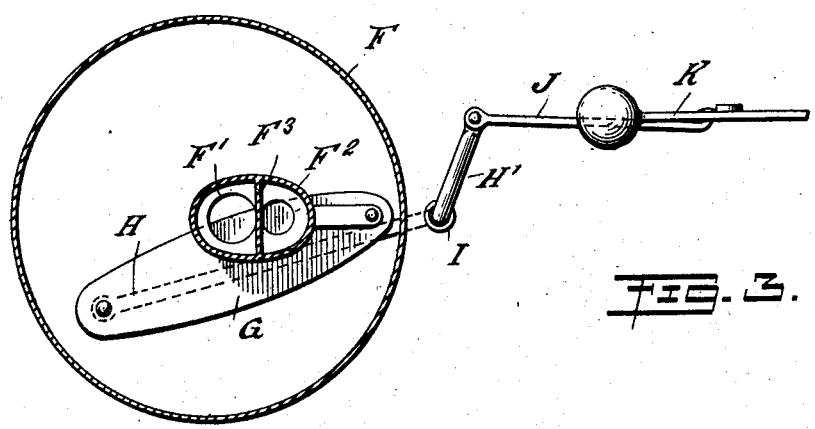
WITNESSES:
G. Robert Thomas
INVENTOR
Howard N. Lines
BY
ATTORNEYS

UNITED STATES PATENT OFFICE.

HOWARD N. LINES, OF SABETHA, KANSAS.

ACETYLENE-GAS GENERATOR.

992,723.  Specification of Letters Patent.  Patented May 16, 1911.

Application filed July 14, 1910. Serial No. 571,908.

*To all whom it may concern:*

Be it known that I, HOWARD N. LINES, a citizen of the United States, and a resident of Sabetha, in the county of Nemaha and State of Kansas, have invented new and useful Improvements in Acetylene-Gas Generators, of which the following is a full, clear, and exact description.

The object of the invention is to provide certain new and useful improvements in acetylene gas generators, whereby a continuous feeding of the carbid takes place in proportion to the consumption of the generated gas, and whereby an alarm is sounded whenever the carbid is nearly exhausted, thus giving the person in charge plenty of time to re-charge the apparatus with carbid. For the purpose mentioned, use is made of a main feed chamber and a supplementary chamber, and means for automatically controlling the said chambers to supply carbid to the generator from the main feed chamber until the latter is exhausted, and to then supply carbid from the supplementary feed chamber to the generator and sounding an alarm at the time the main feed chamber is exhausted of its carbid.

A practical embodiment of the invention is represented in the accompanying drawings forming a part of this specification, in which similar characters of reference indicate corresponding parts in all the views.

Figure 1 is a sectional side elevation of the acetylene gas generator; Fig. 2 is an enlarged sectional plan view of the same on the line 2—2 of Fig. 1; and Fig. 3 is a similar view of the same on the line 3—3 of Fig. 1, and showing the valve in the open position.
A generating vessel A is provided with a filling spout B for charging the vessel A with water, and the upper end of the vessel A is connected by a pipe C with a gasometer D, of any approved construction, and having the usual bell D', rising and falling with the supply and consumption of the gas, the gasometer being connected with the service pipe E for conducting the generated gas to the burners.
On the top of the generating vessel A is mounted a carbid holder F, for containing carbid, and having in its bottom a main feed chamber F' and a supplementary feed chamber F², the chambers being separated from each other by a partition F³, and the exits of the said chambers being located one alongside the other and inclined to the horizontal, as plainly indicated in Fig. 1. The exits of the feed chambers F' and F² are controlled by a valve G, preferably in the form of a horizontally-disposed elongated plate, pivoted at G' to the under side of the supplementary feed chamber F², so that the exit thereof is nearer to the fulcrum G' than the exit of the feed chamber F'. The exit of the main feed chamber F' is also preferably larger than the exit of the supplementary feed chamber F², as plainly indicated in Figs. 2 and 3. The free end of the valve G is pivotally connected with a lever H, fulcrumed in a water seal I arranged on the generating vessel A, to permit of extending the lever H to the outside of the vessel A and the holder F, as will be readily understood by reference to Fig. 1. The outer angular end H' of the lever H is pivotally connected by a link J with a weighted lever K, fulcrumed on a bracket L, attached to the gasometer D, and on the weighted lever K is pivoted an arm N, resting on a pin O carried by the lever K, the free end of the arm N being adapted to be engaged by a projection D² on the gasometer bell D', so that when the latter sinks below normal position then the projection D² bears on the arm N, to impart a swinging motion to the lever K, which by the link J actuates the lever H, and the latter then swings the valve G to one side, as indicated in Fig. 3, so as to allow carbid to pass from the feed chamber F' down into the generating vessel A, to generate gas therein. It is understood that during this sidewise movement of the valve G, the exit of the main feed chamber F' is opened, while that of the supplementary feed chamber F² practically remains closed. When the generating gas flows from the generating vessel A into the gasometer D, then the bell D' again rises above a normal level and consequently the lever K returns to its normal position, and in doing so the valve G is moved back to its normal closing position indicated in Fig. 2.

The above-described operation is repeated, that is, on the consumption of gas the bell D' sinks and actuates the lever K, which by the connection described causes the valve G to swing into open position, to feed carbid from the holder F by way of the main feed chamber F' into the generating vessel A. Now when the carbid in the holder F and the main feed chamber F', with the exception of the carbid contained in the supplementary feed chamber F², has been discharged into the vessel A, then further feeding of carbid into the generating vessel A ceases, and on further withdrawal of gas from the gasometer D the bell D' sinks below a normal level, and in doing so it causes a further swinging of the lever K, whereby the valve G is swung so far to one side that it uncovers the exit of the supplementary feed chamber F² into the vessel A to generate gas. When this supplementary feeding of the carbid from the feed chamber F² takes place, an alarm is sounded, and for this purpose the following arrangement is made: The weight K' of the lever K is adapted to make contact with a contact plate P held on a bracket Q attached to the vessel A, and the contact P is connected by a wire R with an electric alarm S, of any approved construction, and located in a house or other place within hearing of the operator in charge of the apparatus. The alarm S is connected by a return wire R' with the lever K, so that when the weight K' makes contact with the contact P then the circuit is closed, and the alarm S is sounded at the time the gasometer bell D' sinks below a normal position, that is, at the time the valve G is moved into open position, for feeding the carbid from the supplementary feed chamber F² into the generating vessel A, as above described. By the arrangement described, the alarm is sounded, say, from one to two days prior to the complete emptying of the holder F of carbid, so that the person in charge of the apparatus has ample time to re-charge the holder F with carbid during the day without inconveniencing the user by lack of gas.

The exits of the feed chambers F' and F² are preferably on an incline relative to the top face of the valve G, so as to prevent clogging of the carbid passing through the exits onto the valve G down into the vessel A when the valve is open, as above explained.

It is understood that when the bell D' of the gasometer D has actuated the lever K to the full extent, and the lever N has slipped off the projection D² and the machine is recharged with carbid, then the gas bell D' can rise and lift the lever N without affecting the normal position of the lever K, which by its weight K' dropped to normal position after the lever N slipped off the projection D² on the sinking of the bell D'. It is understood that the feeding of carbid from feed chambers takes place only when the gas bell is working on arm N, and should there be enough carbid fed into the water to produce enough gas to raise the bell above arm N, then the feeding stops until enough gas has been withdrawn to allow the bell to fall on arm N.

Having thus described my invention, I claim as new and desire to secure by Letters Patent:

1. An acetylene gas generator, provided with a main and a supplementary feed chamber, a valve mounted to swing beneath the outlets of said chambers and controlling the same, the outlet of said supplementary chamber being nearer the fulcrum of said valve than the outlet of the main chamber, and means connected with the free end of said valve for automatically actuating the same to supply carbid to the generator from the main feed chamber until the latter is exhausted, and to then supply carbid from the supplementary feed chamber to the generator.

2. An acetylene gas generator provided with a main and a supplementary feed chamber, a valve mounted to swing and controlling the outlets of said chambers, means for automatically swinging the said valve to supply carbid to the generator from the main feed chamber until the latter is exhausted, and to then supply carbid from the supplementary feed chamber to the generator, the said means including a weighted lever, and connections between the weighted lever and the free end of said valve, and an alarm controlled by the weighted lever and actuated at the time the main feed chamber is exhausted of its carbid.

3. An acetylene gas generator, comprising a generating vessel for containing water, a carbid holder for charging the said generating vessel with carbid, having a main and a supplementary feed chamber, a swing valve comprising an elongated plate fulcrumed at one end for controlling the outlets from said feed chambers into the said generating vessel, the supplementary feed chamber being nearest the fulcrum of the valve, and means connected with the free end of said valve for actuating the same to supply the generating vessel with carbid from the main feed chamber, and when the latter is empty to supply the generating vessel with carbid from the supplementary feed chamber.

4. An acetylene gas generator, comprising a generating vessel for containing water, a carbid holder for charging the said generating vessel with carbid, and having a main and a supplementary feed chamber, controlling means for controlling the outlets from the said feed chambers into the said generating vessel, to supply the generating vessel with carbid from the main feed chamber, and when the latter is empty to supply the generating vessel with carbid from the supplementary feed chamber, the said controlling means including a valve fulcrumed at one end and mounted to swing beneath the outlets of said chambers, a lever connected with the free end of said valve and extending to the outside of the generating vessel, a link connected with said lever, a weighted lever connected with said link for actuating the valve by the movement of the weighted lever, a gasometer connected with the said generating vessel for receiving and storing gas generated in the said vessel, and means for moving the weighted lever from the gasometer bell.

5. An acetylene gas generator, comprising a generating vessel for containing water, a carbid holder for charging the said generating vessel with carbid and having a main and a supplementary feed chamber, means for controlling the outlets from the said feed chambers into the said generating vessel to supply the generating vessel with carbid from the main feed chamber, and when the latter is empty to supply the generating vessel with carbid from the supplementary feed chamber, the said controlling means including a valve mounted to swing, a lever connected with the valve and fulcrumed in a water seal arranged on the generating vessel, the said lever extending to the outside of said vessel, a weighted lever, and a connection between the weighted lever and the first mentioned lever for actuating the latter and the valve, a gasometer connected with the said generating vessel for receiving and storing gas generated in the said vessel, means for moving the weighted lever from the gasometer bell, and an alarm controlled by the weighted lever at the time the main feed chamber is empty.

6. An acetylene gas generator, comprising a generating vessel for containing water, a carbid holder for charging the said generating vessel with carbid and having a main and a supplementary feed chamber, a valve mounted to swing and controlling the outlets of the said feed chambers, the supplementary feed chamber being nearest the fulcrum of the valve, a gasometer connected with the said generating vessel for receiving and storing the generated gas, and a connection between the bell of the said gasometer and the said valve.

7. An acetylene gas generator, comprising a generating vessel for containing water, a carbid holder for charging the said generating vessel with carbid and having a main and a supplementary feed chamber, a valve mounted to swing and controlling the outlets of the said feed chambers, the supplementary feed chamber being nearest the fulcrum of the valve, a gasometer connected with the said generating vessel for receiving and storing the generated gas, a connection between the bell of the said gasometer and the said valve, and an alarm actuated by the said bell at the time the main feed chamber runs empty.

8. An acetylene gas generator, comprising a generating vessel for containing water, a carbid holder for charging the said generating vessel with carbid and having a main and a supplementary feed chamber, a swing valve in the form of an elongated plate controlling the exits of the said feed chambers, the said supplementary feed chamber being nearest the fulcrum of the valve and the exits of the feed chambers being inclined to the face of the valve, a gasometer connected with the said generating vessel for receiving and storing the generated gas, and a connection between the said valve and the bell of the gasometer.

9. An acetylene gas generator, having a carbid holder provided with a main and a supplementary feed chamber, the said chambers having their exits located one alongside the other and inclined to the horizontal, a valve comprising an elongated plate fulcrumed at one end and mounted to swing beneath the outlets of said chambers and controlling the same, and means connected with the free end of the valve for automatically actuating the said valve.

In testimony whereof I have signed my name to this specification in the presence of two subscribing witnesses.

HOWARD N. LINES.

Witnesses:
W. C. MYRICK,
JNO. H. JUDY.